US010670510B2

(12) United States Patent
Sung et al.

(10) Patent No.: US 10,670,510 B2
(45) Date of Patent: Jun. 2, 2020

(54) 3-D HOLOGRAPHIC IMAGING CONTINUOUS FLOW CYTOMETRY (71) Applicant: Massachusetts Institute of Technology, Cambridge, MA (US)

(72) Inventors: Yongjin Sung, Boston, MA (US); Niyom Lue, Nahant, MA (US); Zahid Yaqoob, Cambridge, MA (US); Ramachandra Dasari, Shererville, IN (US); Peter T. C. So, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 879 days.

(21) Appl. No.: 14/173,804

(22) Filed: Feb. 5, 2014

(65) Prior Publication Data

US 2014/0333929 A1 Nov. 13, 2014

Related U.S. Application Data (60) Provisional application No. 61/761,079, filed on Feb. 5, 2013.

(51) Int. Cl.
*G03H 1/04* (2006.01)
*G01N 15/14* (2006.01)
(Continued)

(52) U.S. Cl.
CPC ..... *G01N 15/1434* (2013.01); *G01N 15/1475* (2013.01); *G01N 21/53* (2013.01);
(Continued)

(58) Field of Classification Search
CPC ............... G03H 1/0866; G03H 1/0443; G03H 2001/005; G03H 2210/12;
(Continued)

(56) References Cited

U.S. PATENT DOCUMENTS 4,293,221 A 10/1981 Kay et al.
5,633,714 A 5/1997 Nyyssonen
(Continued)

FOREIGN PATENT DOCUMENTS

WO 2005/001445 A2 1/2005
WO 2006/010253 A1 2/2006
(Continued)

OTHER PUBLICATIONS

Fang-Yen et al., Video-rate tomographic phase microscopy. J Biomed Opt. Jan.-Feb. 2011;16(1):011005-1-011005-5.
(Continued)

*Primary Examiner* — Hwa Andrew Lee
(74) *Attorney, Agent, or Firm* — McCarter & English, LLP; Thomas O. Hoover (57) ABSTRACT Refractive index of biological specimens is a source of intrinsic contrast that can be explored without any concerns of photobleaching or harmful effects caused by extra contrast agents. This feature also contains rich information that can be related to the metabolism of cells at the cellular and subcellular levels. The present invention relates to systems and methods that can provide, without any moving parts, the 3-D refractive index map of continuously flowing biological samples in a micro-fluidic channel, for example.

24 Claims, 10 Drawing Sheets (51) Int. Cl.
G03H 1/08 (2006.01)
G01N 21/53 (2006.01)
G01N 21/64 (2006.01)
G03H 1/00 (2006.01)

(52) U.S. Cl.
CPC .......... G01N 21/64 (2013.01); G03H 1/0443 (2013.01); G03H 1/0866 (2013.01); *G01N 15/1484* (2013.01); *G01N 2015/1445* (2013.01); *G03H 2001/005* (2013.01); *G03H 2001/0033* (2013.01); *G03H 2001/0445* (2013.01); *G03H 2210/12* (2013.01)

(58) Field of Classification Search
CPC ... G03H 2001/0445; G03H 2001/0033; G01N 21/53; G01N 15/1475; G01N 15/1484
See application file for complete search history.

(56) References Cited

U.S. PATENT DOCUMENTS

| | | | |
|---|---|---|---|
| 7,365,858 | B2 | 4/2008 | Fang-Yen et al. |
| 8,848,199 | B2 | 9/2014 | Choi et al. |
| 8,896,840 | B2 | 11/2014 | Matsubara et al. |
| 2002/0109841 | A1* | 8/2002 | Gould ................ G01J 3/02 356/318 |
| 2002/0132315 | A1 | 9/2002 | Wang et al. |
| 2004/0095576 | A1 | 5/2004 | Wolleschensky |
| 2006/0291712 | A1 | 12/2006 | Popescu et al. |
| 2007/0058174 | A1 | 3/2007 | Hill |
| 2008/0259345 | A1 | 10/2008 | Fukutake |
| 2009/0125242 | A1* | 5/2009 | Choi ................ G01N 21/45 702/19 |
| 2010/0238442 | A1 | 9/2010 | Heng et al. |

FOREIGN PATENT DOCUMENTS

| | | |
|---|---|---|
| WO | 2007/116365 A2 | 10/2007 |
| WO | 2012/062805 A1 | 5/2012 |

OTHER PUBLICATIONS

Charrière et al., Biological cell (pollen grain) refractive index tomography with digital holographic microscopy. Proceedings of SPIE vol. 6090. Three-Dimensional and Multidimensional Microscopy: Image Acquisition and Processing XIII, 609008-1-609008-8. Feb. 23, 2006.

Charrière et al., Living specimen tomography by digital holographic microscopy: morphometry of testate amoeba. Opt Express. Aug. 7, 2006;14(16):7005-13.

Charrière et al., Cell refractive index tomography by digital holographic microscopy. Optics Letters 31(2):178-180 (Jan. 2006).

Choi et al., Extended depth of focus in tomographic phase microscopy using a propagation algorithm. Opt Lett. Jan. 15, 2008;33(2):171-3.

Choi et al., Field-based angle-resolved light-scattering study of single live cells. Opt Lett. Jul. 15, 2008;33(14):1596-8.

Choi et al., Tomographic phase microscopy. Nat Methods. Sep. 2007;4(9):717-9.

Choi et al., Tomographic Phase Microscopy. Quantitative 3D Imaging of Living Cells. BIOforum Europe. pp. 2-3 (Oct. 2007).

Dengler, A multi-resolution approach to the 3D reconstruction from an electron microscope tilt series solving the alignment problem without gold particles. Ultramicroscopy. Jul.-Aug. 1989;30(3):337-348.

Fang-Yen et al, Imaging voltage-dependent cell motions with heterodyne Mach-Zehnder phase microscopy. Opt Lett. Jun. 1, 2007;32(11):1572-4.

Ikeda et al., Hilbert phase microscopy for investigating fast dynamics in transparent systems. Opt Lett. May 15, 2005;30 (10):1165-7.

Lue et al., Quantitative phase imaging of live cells using fast Fourier phase microscopy. Appl Opt. Apr. 1, 2007;46 (10):1836-42.

Lue et al., Tissue refractometry using Hilbert phase microscopy. Opt Lett. Dec. 15, 2007;32(24)3522-4.

Mann et al., Movies of cellular and sub-cellular motion by digital holographic microscopy. Biomed Eng Online. Mar. 23, 2006;5:21. pp. 1-10.

Peng et al., 3-D imaging and modeling—Part I: acquisition and registration, Optik Sep. 2002;113(10):448-452.

Rangayyan et al., Algorithms for limited-view computed tomography: an annotated bibliography and challenge. Appl Opt. Dec. 1, 1985;24(23):4000-4012.

Suhara, Interferometric measurement of the refractive-index distribution in plastic lenses by use of computed tomography. Appl Opt. Sep. 1, 2002;41(25):5317-25.

Sun, Spatial phase-shifting technique in large image-shearing electronic speckle pattern interferometry. Optical Engineering, Feb. 2007;46(2):025602-1-025602-6.

Sung et al. Optical diffraction tomography for high resolution live cell imaging. Opt Express. Jan. 5, 2009;17(1):266-77.

Sung et al., Stain-free quantification of chromosomes in live cells using regularized tomographic phase microscopy. PLoS One. Nov. 2012;7(11):e49502.

Sung et al., Three-Dimensional Holographic Refractive-Index Measurement of Continuously Flowing Cells in a Microfluidic Channel. Phys Rev Appl. Feb. 27, 2014;1. pii: 014002-1-014002-8.

Vertu et al., Optical projection microtomography of transparent objects. Optical Coherence Tomography and Coherence Techniques III. Peter E. Andersen (Ed.) Proc. of SPIE-OSA Biomedical Optics, SPIE 2007;6627:66271A-1-66271A-6.

Vishnyakov et al., Optical tomography of living cells using phase-shifting Linnik microscope. Part of the EUROPTO Conference on Optical Microscopy. SPIE Sep. 1998:3568:197-200.

Zhou et al., Optical coherence tomography based projected index computed tomography. Fifth International Conference on Photonics and Imaging in Biology and Medicine. Qingming Luo (Ed.). Proc. of SPIE May 2007;6534:65342U-1-65342U-6.

Zysk et al., Projected index computed tomography. Opt Lett. May 1, 2003;28(9):701-3.

* cited by examiner

FIG. 1A

Holographic recording of angular spectra

FIG. 3C $k_x$ - $k_y$ section  $k_x$ - $k_z$ section  $k_y$ - $k_z$ section

3-D HOLOGRAPHIC IMAGING CONTINUOUS FLOW CYTOMETRY

CROSS-REFERENCE TO RELATED APPLICATION(S)

This application relates to and claims priority from U.S. Provisional Patent Application No. 61/761,079 filed on Feb. 5, 2013, the entire disclosure of which is incorporated herein by reference in its entirety.

GOVERNMENT SUPPORT

This invention was made with government support under Grant No. EB015871 awarded by the National Institutes of Health. The government has certain rights in the invention.

BACKGROUND OF THE INVENTION

Flow cytometry is a technology that interrogates a large number of cells flowing in a stream of liquid, typically in combination with optical spectroscopy. Flow cytometry has enabled cell characterization even at a genomic level. A contrast mechanism in flow cytometry is fluorescence, externally administered or generated by genetic manipulation. To observe biological specimens in their most native condition, however, stain-free methods utilizing intrinsic properties of a specimen are preferred. Furthermore, the fluorescent labeling is not always a viable option especially for primary cells, and photobleaching and non-uniform binding of the labeling agents usually make it difficult to accurately quantify the target molecules.

Refractive index serves as a source of intrinsic contrast in a variety of imaging modalities including optical coherence tomography and light-scattering spectroscopy. At the same time, the refractive index can be related to the density of organic molecules, and its volume integral can provide the total amount of non-aqueous content in a cell or organelles. Variance and change in the refractive index of cells have been also linked to carcinogenic transformations. The refractive index of homogeneous bulk materials can be obtained with a critical angle refractometer measuring the critical angle of a specimen with respect to the other material with known refractive index. For thin layered materials, ellipsometry measuring depolarization of the incident light is known to be accurate. The refractive index of a non-homogeneous specimen such as biological cells, however, requires a more delicate treatment.

Tomographic phase microscopy (TPM) is a novel technique that has enabled 3-D mapping of refractive index in living cells. Recent developments in TPM promise stain-free monitoring of the physiological status of living cells at the sub-cellular level. Typically, the tomographic imaging of refractive index requires recording multiple images at varying angles of illumination on a specimen; therefore, existing methods had moving elements to change the illumination angle relative to the specimen that was stationary during the data acquisition, or alternatively rotated the specimen. As a result, the throughput of tomographic imaging is usually low, which has prevented TPM from being used for routine biological investigation.

The refractive index can be related to the speed of light wave inside a material. Therefore, wavefront distortion due to a specimen represents the total phase (time) delay of the light wave induced by the specimen. The wavefront distortion can be measured with a Shack-Hartman wavefront sensor, interferometry, or inline holography (also called propagation-based methods). Among these techniques, interferometry is particularly appropriate in the optical regime, where the light sources with a reasonably large coherence length are readily available. The phase delay is proportional to the specimen's optical path length, the integral of refractive index along the light propagation direction. Thus, as described herein the depth-resolved refractive index map may be acquired using a tomographic reconstruction algorithm in conjunction with the wavefront measurement. The tomographic refractive index measurement is typically performed with a collimated laser beam whose angle of incidence onto the sample is varied as in X-ray computer tomography. Alternatively, the refractive index map may be obtained with a spatially-incoherent beam and scanning the objective focus through the sample. In either approach, however, the sample has to be stationary while the illumination direction or the objective focus is varied, which limits the throughput of imaging.

Consequently, further improvements in tomographic phase microscopy are needed to improve the speed and accuracy of imaging systems.

SUMMARY OF THE INVENTION

Huygens principle provides that a plane wave can be synthesized from parallel line-focused beams, whose relative phase determines the wave propagation direction. Thus, systems and methods are provided herein which scan a line-focused beam across a sample and measure the angular spectra of scattered light. Advantageously, the depth-resolved refractive index map may be obtained from the angular spectra acquired for varying locations of the line-focused beam. This imaging technique is also called wave synthesis or synthetic aperture tomography.

In exemplary embodiments, the angular spectra, which are complex quantities, may be measured with phase shifting interferometry (PSI). A filtered back-projection algorithm may be applied for tomographic reconstruction. In PSI, however, the sample has to be stationary during the phase shifting step; thus, images are acquired in a discrete fashion, which limits imaging throughput. Moreover, the filtered back-projection algorithm is not ideal for thick cells. Thus, as taught herein, imaging throughput and applicability (particularly for thicker cells) may be increased by adopting off-axis digital holography for the angular spectra measurement and applying an algorithm based on the scalar diffraction theory for the tomographic reconstruction. In exemplary embodiments, the systems and methods taught herein also utilize a micro-fluidic channel specially designed for a high-numerical-aperture setup which may advantageously be utilized for 3-D refractive index imaging of cells continuously flowing in the micro-fluidic channel (as empirically demonstrated herein).

The present invention relates to systems and methods for 3-D holographic imaging of material such as cells that continuously flow in a micro-fluidic channel. In a preferred embodiment, light such as a laser beam is focused in a line within a micro-fluidic channel that is used to measure angular spectra scattered from the cells flowing across the line. For the measurement of complex scattered fields, off-axis digital holography is used to enable a single-shot recording of the field for each location of a specimen. A microfluidic channel configured to reduce cell tumbling and enable the use of high-NA condenser and objective lenses is used to transport material across the field of view of the system. For data reconstruction, optical diffraction tomography is used to reduce the diffraction artifacts coming from defocused organelles inside cells, and apply an iterative constraint procedure to reduce artifacts due to limited angular coverage of the incident beam. Thus, the present invention provides systems and methods for 3-D holographic imaging flow cytometry.

A preferred embodiment uses a two dimensional detector array to detect a plurality of phase images of a sample moving within the channel. A data processor then processes the image data to provide phase images and to compute a refractive index distribution within the sample. In a preferred embodiment, the phase and amplitude components of the image data are mapped to a 3-D sonogram, a Fourier transform of the data is performed and the data is then mapped to the scattering potential in the frequency domain, a reconstruction process is applied and the inverse Fourier transform is performed to provide the 3-D scattering potential from which the 3-D refractive index distribution is obtained.

In a preferred embodiment of the invention, a plurality of light sources can be used to illuminate the channel at different wavelengths to measure the refractive index dispersion and to quantify molecular composition. Light from two different light sources operating at different wavelengths, for example, can be combined along a common sample delivery path and split onto two different detections after passing through the sample.

BRIEF DESCRIPTION OF THE DRAWINGS

FIG. 4A an exemplary reconstructed refractive index map of the RKO cell: (FIG. 4A(i)) center cross-section (Scale bar, 5 μm); (FIG. 4A(ii)) cross-sections at multiple heights extracted with an 15 μm interval; and (FIG. 4A(iii)) the bottom half of the same cell after 3-D rendering;

DETAILED DESCRIPTION OF THE INVENTION

Refractive index (RI) of biological specimens is a source of intrinsic contrast that can be explored without any concerns of photobleaching or harmful effects caused by extra contrast agents. In addition, RI contains rich information related to the metabolism of cells at the cellular and subcellular levels. The subject application discloses a no-moving parts approach that provides three-dimensional (3-D) RI maps of biological samples continuously flowing in a microfluidic channel. Specifically, line illumination and off-axis digital holography is used to record the angular spectra of light scattered from flowing samples at high speed. In addition, an optical diffraction tomography algorithm is applied to obtain accurate RI maps of the samples from the measured spectra. As demonstrated in empirical studies described herein, the systems and methods of the present disclosure have proven effective in label-free 3-D imaging of live RKO human colon cancer cells and RPMI8226 multiple myeloma cells, as well as in obtaining the volume, dry mass, and density of these cells from the measured 3-D RI maps. These results show that the disclosed systems and methods, alone or in combination with the existing flow cytometry techniques, advantageously enable quantitative stain-free characterization of large number of cells.

The present invention relates to systems and methods for performing holographic phase cytometry. Tomographic phase imaging has been developed to measure phase images of objects and has enabled the measurement of refractive index of small prepared samples that have been stabilized in a holder for measurement. Additional details regarding tomographic phase microscopy systems and methods can be found in U.S. application Ser. No. 12/218,029 filed on Jul. 10, 2008, the entire contents of which is incorporated herein by reference. Further improvements in the quantitative measurement of refractive index and providing diffraction free high resolution 3-D images are described in Sung et al., "Optical diffraction tomography for high resolution live cell imaging," Optics Express, Vol. 17, No. 1 (2009), the entire contents of which is incorporated herein by reference. The refractive index map can be used to determine molecular concentrations of sample components without the addition of exogenous contrast agents. Thus additional quantitative characteristics can be determined using the methods described herein.

Huygens' principle states that a plane wave can be synthesized by superposing multiple point sources that are in-phase and aligned on a planar wavefront. Synthetic-aperture radar, for example, utilizes this principle in order to image an extended sample by incrementally moving a point source and detector. Preferred embodiments of the present invention provide a system for translating a specimen across a line-focused beam, such that a detector system can collect the information needed to reconstruct a 3-D structure of scattering points within the specimen. In the optical regime, this can be implemented with synthetic aperture tomography (SAT) using phase shifting interferometry. However, previously the specimen had to be stationary during the phase-shifting step; therefore, the specimen was mounted on a translation stage and was moved across the line-focus beam in discrete steps.

Figure 1A:
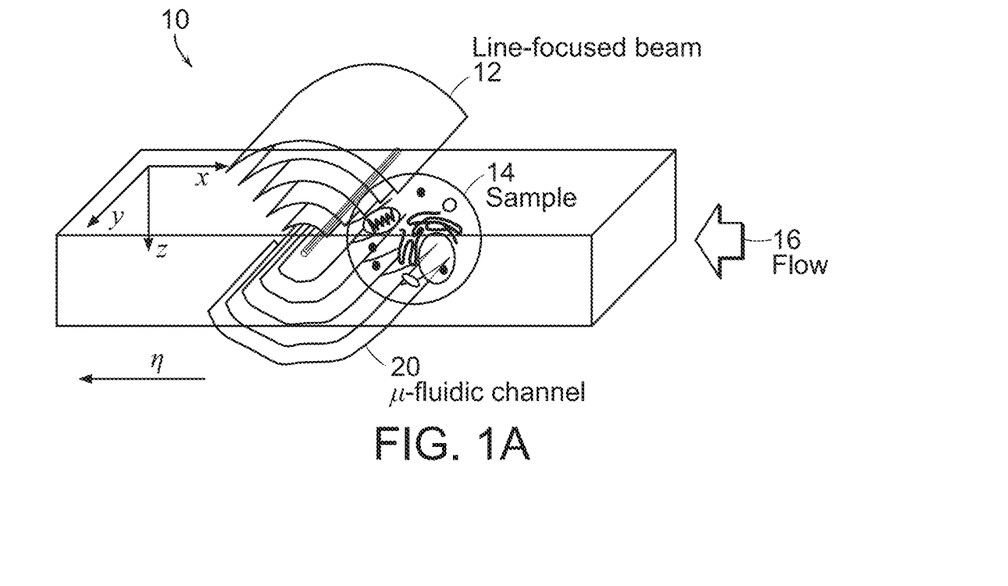
FIG. 1A is a schematic diagram of a 3-D holographic imaging flow cytometry system.

A converging cylindrical wave (FIG. 1A) can be decomposed into plane wave constituents that are in-phase on the line of convergence. Specifically, the complex amplitude of the electric field focused with a cylindrical lens can be written under the non-paraxial condition as $$u_{in}(x,y,z) = \int P(\lambda f p) \exp[i2\pi(px+w(p)z)]dp \quad (1)$$

where the integrand represents a plane wave with the complex amplitude $F(\lambda f p)$ and wave vector $(p, 0, w(p))$. Here, the function $w(p)$ is defined as $w(p)=((1/\lambda)^2-p^2)^{1/2}$, and the variables $\lambda$ and $f$ are the wavelength of the illuminating light and the focal length of the cylindrical lens, respectively. The pupil function $P(x)$ represents the optical aberration of the cylindrical lens or apodization, if any. In quantitative phase imaging, the pupil function can be directly measured and subtracted from the images; therefore, we drop the pupil function in the formulation hereafter.

Consider the scattered field from a specimen is measured in the far field and transmission mode for a general incident field (FIG. 1A). From the scalar diffraction theory, the complex amplitude of the scattered field can be written as $$u_{scat}(\vec{r}) = \int V(\vec{r}')u_{in}(\vec{r}')G(|\vec{r}-\vec{r}'|)d^3r' \quad (2)$$

Here, $G(r)=\exp(ikr)/4\pi r$ is the Green's function for the scalar wave equation (the Helmholtz equation). $\lambda$ is again the wavelength of the incident light in the medium, and $k=2\pi/\lambda$ is the wavenumber.

The function $V(x,y,z)=k^2(1-(n(x,y,z)/n_0)^2)$ is the scattering potential of the specimen in which $n(x,y,z)$ and $n_0$ represent the refractive indices of the specimen and surrounding medium, respectively. Note that for plane wave illumination equation (2) provides the complex scattered phase in conventional optical diffraction tomography. According to the present disclosure systems and methods are provided which illuminate the specimen with a line-focused beam, which includes multiple plane waves, and measure the angular spectra of the scattered light.

For tomographic reconstruction, a series of the angular spectra $E_{samp}(k_x, y; \eta)$ may be recorded for varying locations $\eta$ of the sample while it passes across the line-focused beam, wherein the variable $k_x$ is the spatial frequency coordinate corresponding to the spatial coordinate x. In order to remove any background phase due to optical aberration, one may also record an angular spectrum $E_{bg}(k_x, y)$ before starting the experiment. With the first-order Rytov approximation, the measured angular spectra $E_{samp}(k_x, y; \eta)$ and $E_{bg}(k_x, y)$ can be related to the specimen's scattering potential $V(x,y,z)$ as:

$$\tilde{u}_{scat}(k_x, y; \eta) = \quad (3)$$
$$\frac{1}{i4\pi w(k_x)} \int \tilde{V}(k_x-p, y, w(k_x)-w(p))\exp[i2\pi(k_x-p)\eta]dp,$$

where $\bar{u}_{scat}(k_x, y;\eta)=\log[E_{samp}(k_x, y;\eta)/E_{bg}(k_x, y)]$, and $w(u)=(k^2-u^2)^{1/2}$. Again, the variable $k_x$ is the spatial frequency corresponding to the spatial coordinate x and the angular spectrum $\tilde{u}_{scat}(k_x, y;\eta)$ is measured for different values of $\eta$ (see FIG. 1A).

Taking the Fourier transform of Eq. (3) with respect to y and $\eta$, the following equation is derived:

$$\tilde{V}(k_x,k_y,k_z) = i4\pi w(k_x)\tilde{\bar{u}}_{scat}(k_x,k_y;k_\eta) \quad (4)$$

where $k_z=w(k_x)-w(k_x-k_\eta)$. $\tilde{\tilde{u}}_{scat}(k_x,k_y;k_\eta)$ is the 2-D Fourier transform of $\bar{u}_{scat}(k_x, y;\eta)$ with respect to y and $\eta$. Equation (4) relates the measured angular spectra with the specimen's scattering potential in the spatial frequency space. Thus:

$$\tilde{u}_{scat}(k_x, k_y; k_\eta) = \frac{1}{i4\pi w(u)}\tilde{V}(\xi, k_y, w(k_x)-w(k_x-k_\eta)). \quad (5)$$

Equation (5) provides a way to map the measured angular spectra scattered from a specimen to the scattering potential of the specimen in the spatial frequency space.

Figure 1B:
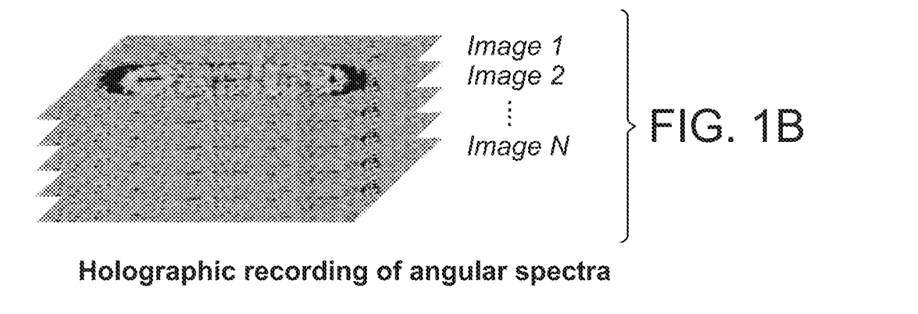
FIG. 1B shows a plurality of N two dimensional images that form a 3-D representation of an object imaged using a flow cytometer.
Figure 1C:
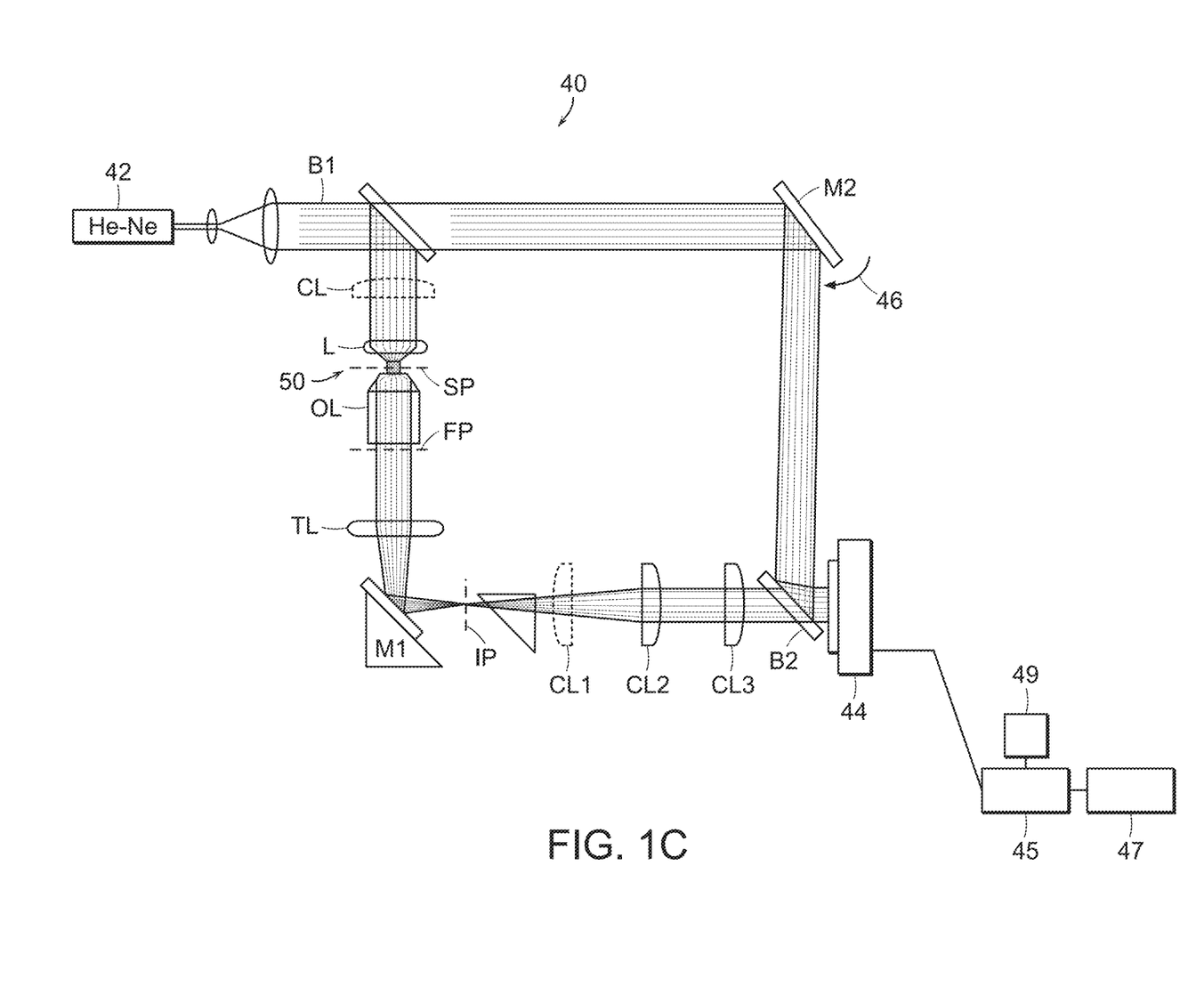
FIGS. 1C and 1D include schematic diagrams of exemplary optical systems used to record the angular spectra scattered from a sample (where CL and CL1-3: cylindrical lens; M1 and M2: mirror; B1 and B2: beam splitter L: condenser lens; OL: objective lens; TL: tube lens; and SP: sample plane; FP: back focal plane and IP: Image Plane) and a micro-fluidic channel used for measurements.
Figure 1D:
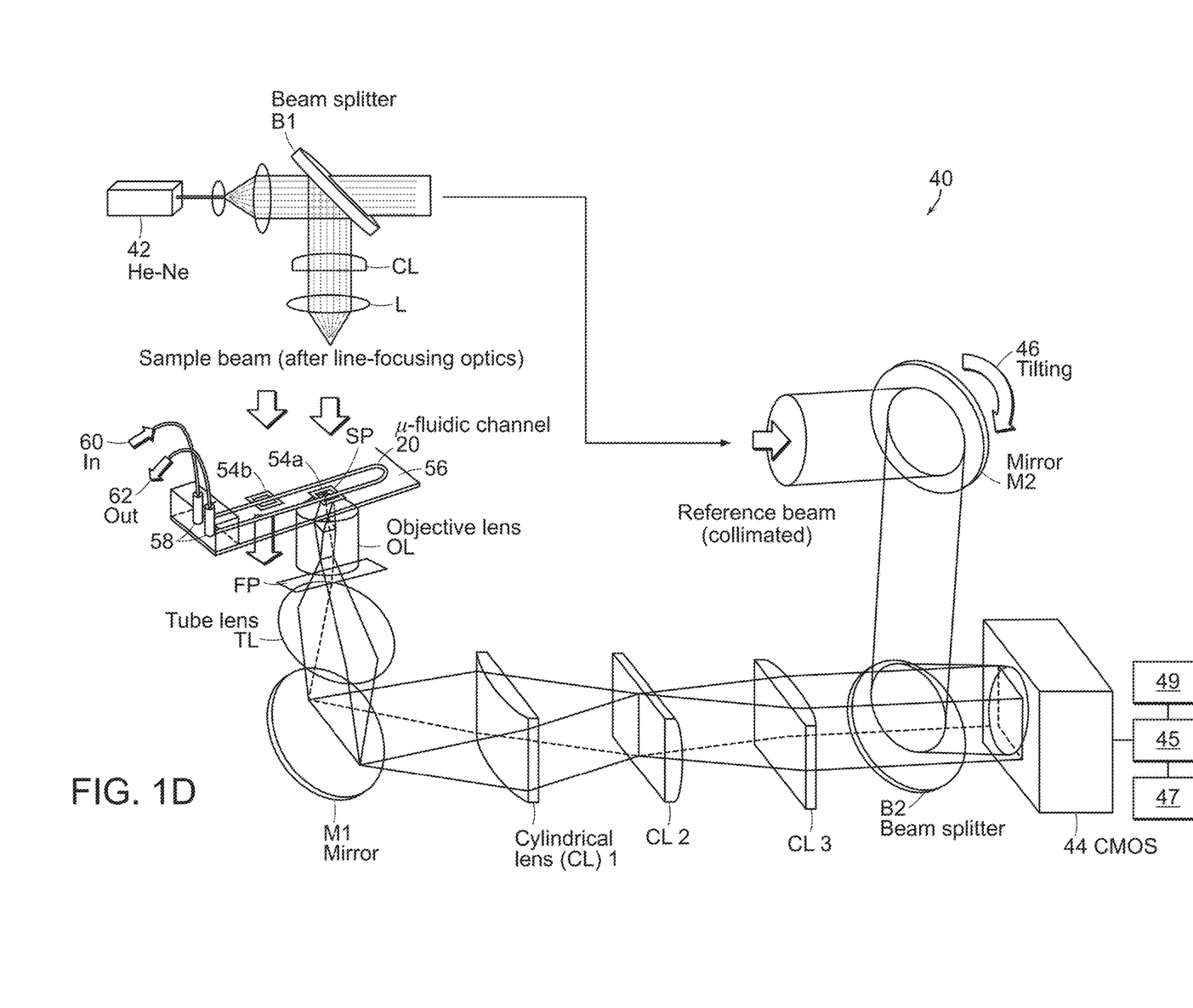

FIGS. 1C and 1D show exemplary systems 40 used to record the angular spectra from a sample, e.g., the sample shown in FIG. 1B. This Mach-Zehnder-type interferometer enables the recording of both the amplitude and phase of a complex field in a single shot measurement. The system may include a light source 42, e.g., an He—Ne laser ($\lambda$=633 nm). Initial beam shaping optics (e.g., a pair of condenser lenses) are used to expand the beam of light from the light source 42 after which it is split using a first beam splitter B1 into a reference beam (collimated) and a sample beam. A line-focused beam is generated from the sample beam using a high numerical aperture condenser lens (e.g., numerical aperture=1.4) and a cylindrical lens CL (e.g., f=100 mm), The line focused beam is focused on a field of view (FOV) plane with respect to a micro-fluidic channel 20 Thus, the system provides a continuous flow 16 of cells in the micro-fluidic channel 20 across the line focused beam while recording the angular spectra from the cells. The flow speed can be adjusted so as to acquire around 400-500 images per cell for a given frame rate of the CMOS camera 44 (e.g., corresponding to 5000 frame/sec image acquisition rate and a flow speed of about 150 μm/sec, assuming a cell diameter of about 15 μm). For the images acquired, a 5000 frame/sec image acquisition rate was used, which was determined based on the photon flux at the detector 44. Both fine scanning resolution (e.g., high frame rate) for a sample and high numerical aperture (NA) of the imaging system are important to achieve high spatial resolution. However, note that increasing the scanning resolution can lower the imaging throughput. The working distance of high-NA oil immersion lenses is typically less than 200 μm, and this involves using a thickness of an upper PDMS (Polydimethylsiloxane) layer and the overall height of micro-fluidic channels to be accordingly small (e.g., to minimize cell tumbling and rotation within the channel the channel height may be slightly larger than the average diameter of cells). Using precise control of a soft-lithography process, a microfluidic device that meets these criteria was made and used for phase imaging. For the images acquired the dimension of the channel cross-section used was 30×400 μm² (height×width). In some embodiments, the substrate thickness between a center line of the flow channel and a surface proximal to the collection optics is less than 200 μm or preferably less than 100 μm.

In exemplary embodiments, the flow channel may include a cross-sectional diameter, e.g., a height, that is between 150-200% the size of an estimated width of the sample. In some embodiments, at least one of (i) a cross-sectional height and (ii) a cross-sectional width of the flow-channel may be selected to at least one of (i) reduce rotation of the sample in the flow channel and (ii) increase stability of the sample in the flow channel. In some embodiments, the cross-dimensional height and cross-dimensional width of the flow channel may be approximately equal. In such embodiments, rotation may be estimated as described herein. In some embodiments, at least one of (i) the cross-sectional height and (ii) the cross-sectional width of the flow-channel may be selected based on empirical data, e.g., based on rotation estimations for a plurality of tested flow channels derived from imaging of a reference material flowing in each of the tested flow channels. For example, a convolution may be applied based on an estimated or actual rotation of a sample to compensate for such rotation.

A data processor 45 is connected to the detector 44 to process the image data. A memory 47 can store the data for display to the user on electronic display device 49. Note that processor 45 can also be used to control system operating parameters.

Figure 1E:
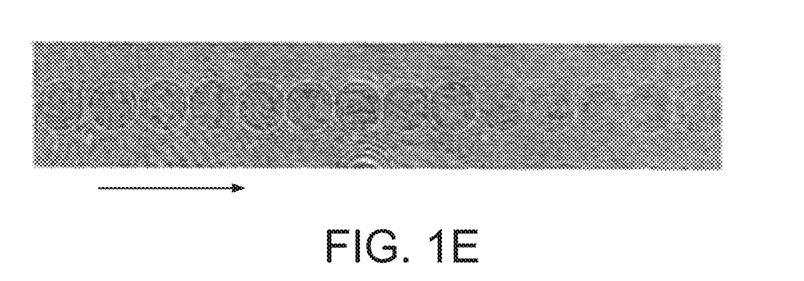
FIG. 1E depicts a synthesized image of a 10 μm-polystyrene bead flowing in the channel.

FIG. 1D further shows a schematic of the flow channel device 50 used in accordance with a preferred embodiment of the invention. For proper 3-D reconstruction, the height of cells and their speed in the micro-fluidic channel 20 is required to be roughly constant while they flow across the line-focused beam. The channel 20 is formed on a substrate 506 with a field of view 54 situated adjacent the lens (OL). A manifold 58 can be used to control fluid through the inflow and outflow ports 60, 62. Using the micro-fluidic channel, the flow of polystyrene beads in a water channel was recorded using a wide-field microscope equipped with a light source 42 such as a laser for illumination. FIG. 1E is a synthesized image of raw images extracted with 0.01 second intervals. From the displacement of the bead, the flow speed is estimated to be uniform at 1 mm/sec, and the stream-wise linear motion of beads shows that migration in the transverse direction is negligible. Noteworthy, in the inline-holography system, the change in the height of beads can be noticed from the change in diffraction rings, which is shown to be negligible here.

Figure 2:
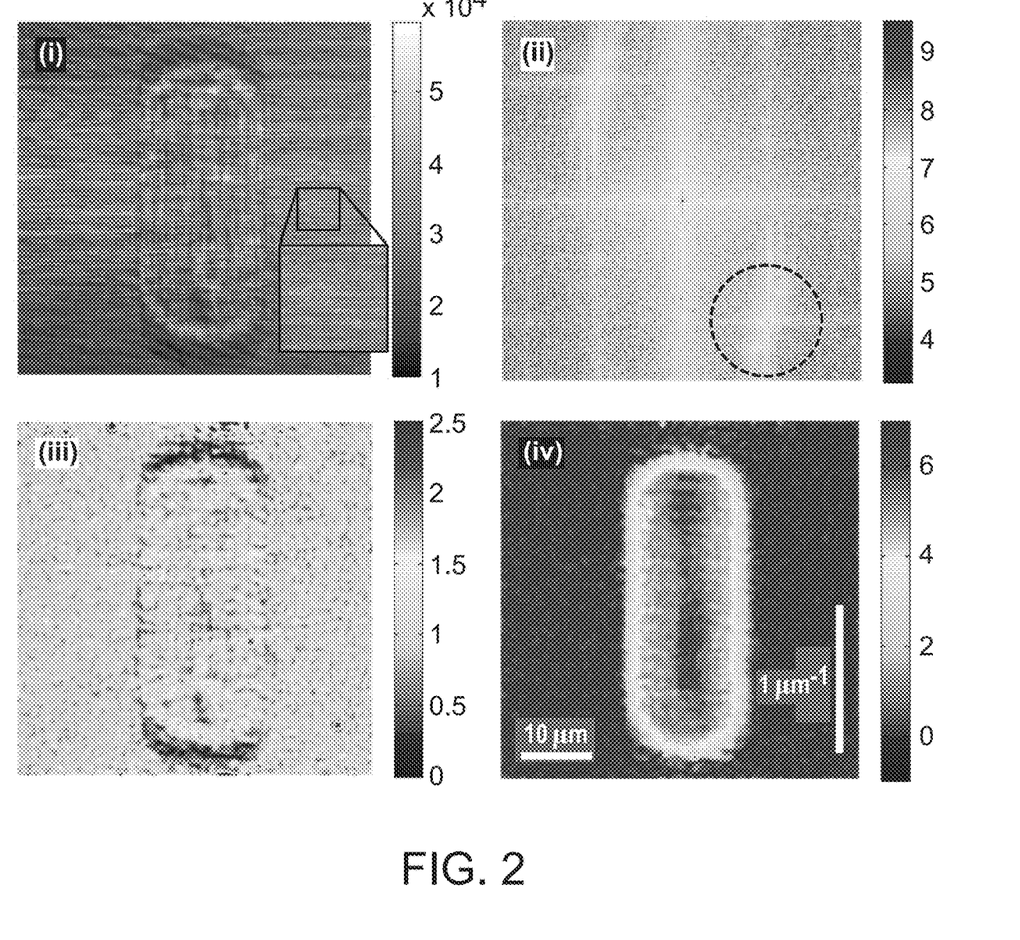
FIG. 2 illustrates a raw interferogram image; the magnitude of the Fourier transform of the ray image shown in a logarithmic scale (base 10); and extracted amplitude and phase images, respectively.

FIG. 2 shows an example of interferogram image recorded (i) and the amplitude of its Fourier transform (ii). The region in the dotted circle contains the information of the angular spectrum scattered from a specimen. This information is separately recorded from the unscattered light (the peak at the center) by off-axis digital holography. By selecting the dotted region, moving the dotted region to the center and taking its inverse Fourier transform, one can retrieve the complex angular spectra $\tilde{u}_{scat}(k_x, y; \eta)$. FIG. 2 (iii) and (iv) show the amplitude and phase respectively of the angular spectra retrieved from the image in 2A (i).

Figure 3A:
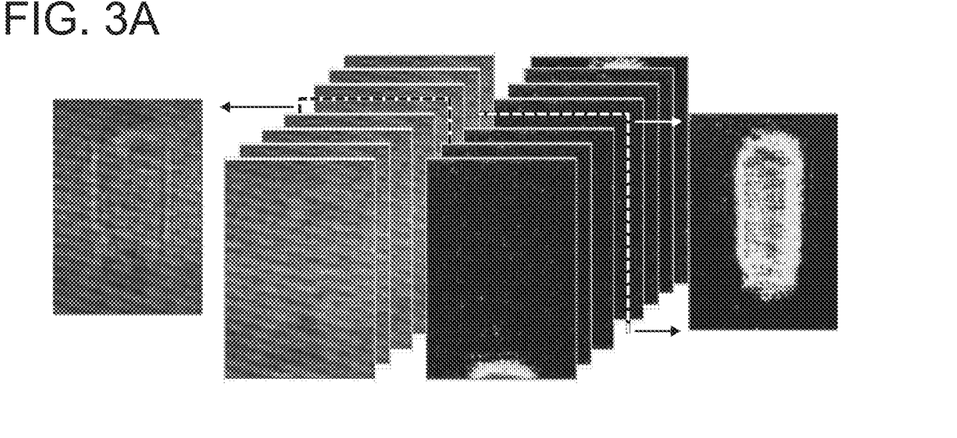
FIGS. 3A-C depict a series of raw interferogram images and corresponding phase images recorded for different locations of the sample (FIG. 3A); sinogram, complex scattered fields plotted for varying values of $k_n$ (FIG. 3B); spatial frequency spectrum of an RKO human colon cancer cell after the mapping: $k_x$-$k_y$ cross-section (FIG. 3C(i)); $k_x$-$k_y$ cross-section (FIG. 3C(ii)); and cross-section in a $k_x$-$k_y$ plane containing the dotted line in FIG. 3C(ii) (FIG. 3C(iii). Note that a scale bar (1 $\mu m^{-1}$) in FIG. 3C(i) is also applied to FIG. 3C(ii) and FIG. 3C(iii).
Figure 3B:
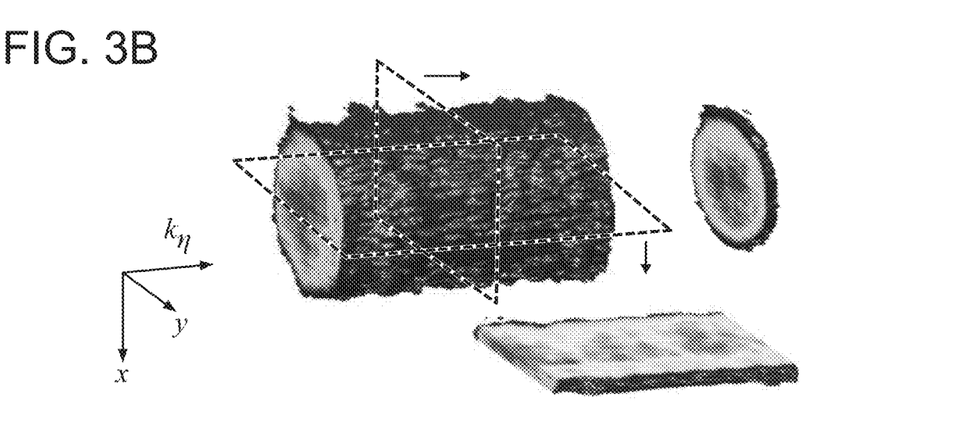

FIG. 3 depicts exemplary mapping of the complex fields in the spatial frequency space. Raw interferogram images, and thus angular spectra for varying locations η of the sample can be obtained (FIG. 3A). Next, the Fourier transform of the data cube along the $k_x$ and η directions, is taken which provides a sinogram as shown in FIG. 3B. Note that x and y are spatial coordinates, and $k_\eta$ corresponds to the angle of illumination. Then, take the Fourier transform of the sinogram with respect to x and y, and map it in the 3-D spatial frequency space using the Fourier diffraction theorem, Eq. (5). Alternatively one could simply take the Fourier transform of the original data cube with respect to x and y, and map it in the 3-D spatial frequency space using Eq. (4)

Figure 3C:
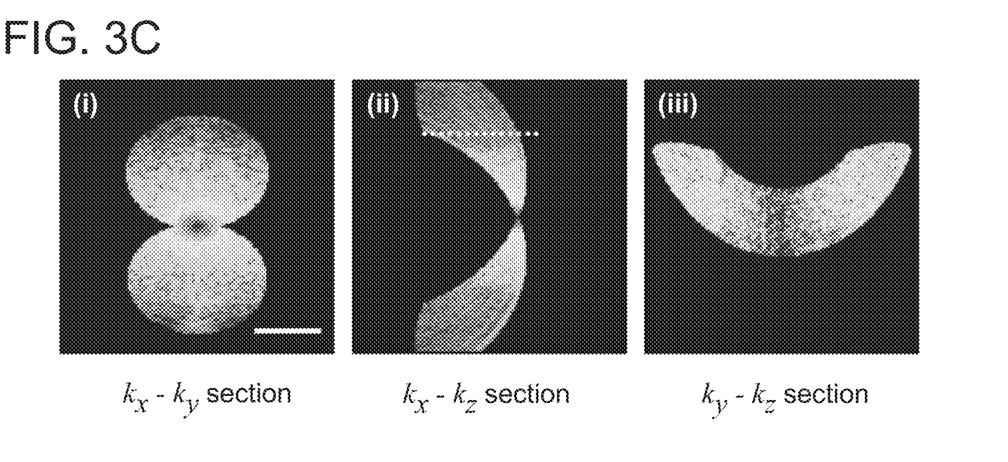
Figure 4A:
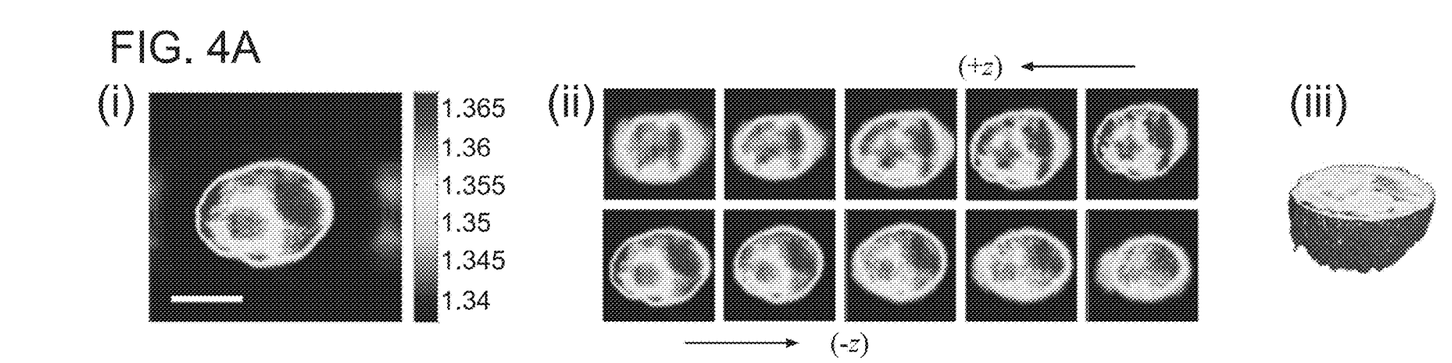
Figure 4B:
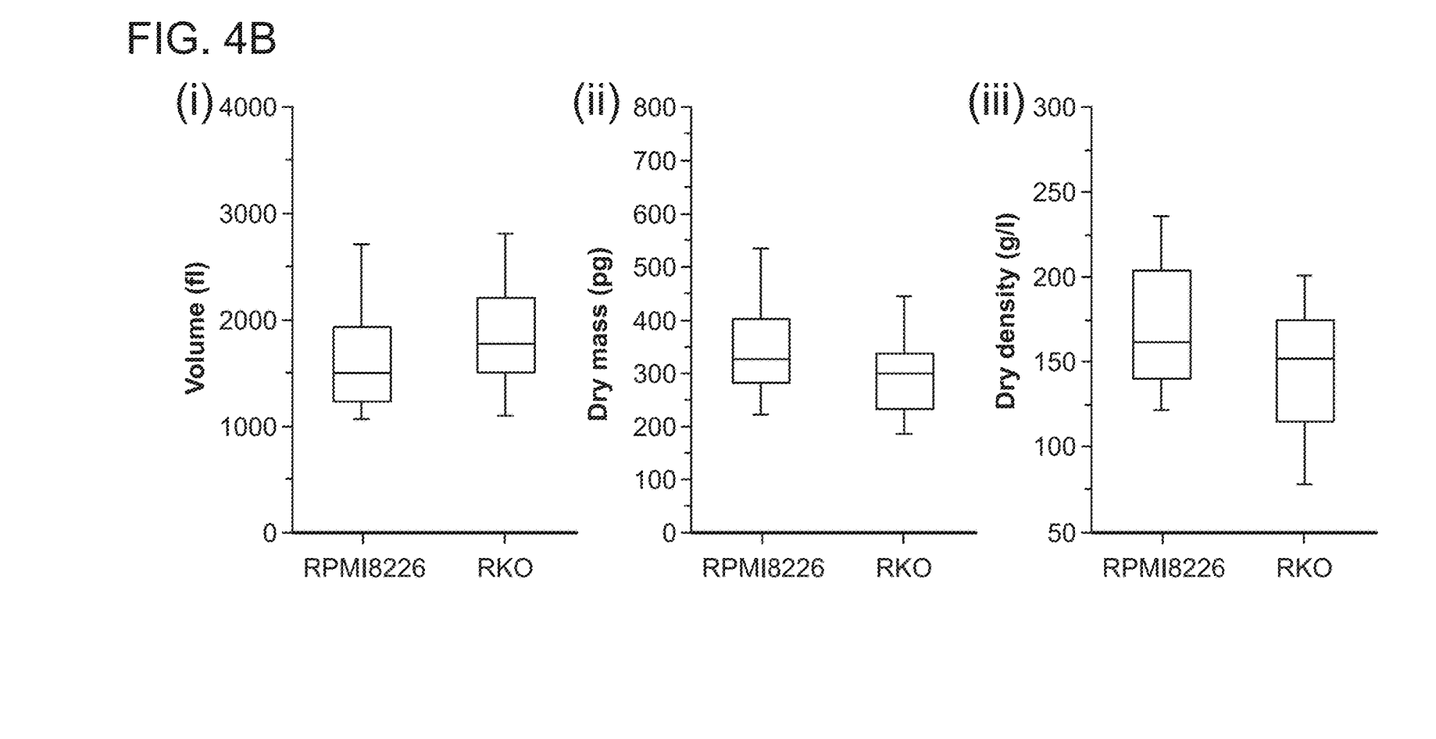
FIG. 4B(i-iii) illustrate normalized estimation of volume (0.980±0.110) and refractive index values (0.986±0.032) of 10-μm polystyrene beads. N=8; the volume of RPMI8226 (1654±69 fl) and RKO cells (1845±70 fl); the dry mass of RPMI8226 (345±13 pg) and RKO cells (300±11 pg); and the dry density of RPMI8226 (170±5 g/l) and RKO cells (145±5 g/l). N=60 for both cells.

FIG. 3C shows cross-section images of the spatial frequency map $\check{V}$ of an RKO human colon cancer cell after the mapping. In a preferred embodiment, samples flow across a line-focused beam, and this is equivalent to changing the angle of illumination linearly in rotating-beam geometry. Therefore, an empty region resembling an apple core can be present near the center of the image in FIG. 3C (i). The $k_x$–$k_z$ cross-section (FIG. 3C (ii)) shows a similar missing region, which is due to the limited angular coverage of the condenser and objective lenses. These empty regions generate the so-called missing angle artifacts, which can be suppressed by incorporating a priori information of the sample in an iterative reconstruction process. In this embodiment, an algorithm utilizing the non-negativity of mass density, which accurately provides mean refractive index values of cells was used. For more complete compensation of the missing angle data one can apply additional constraints, e.g., piecewise-smoothness of the refractive index profile, in the reconstruction process. In addition, the spatial resolution and optical sectioning capability are the same as those for plane wave tomography adopting the one-axis scanning FIGS. 4A-B depicts exemplary Mapping of the complex fields in the spatial frequency space. In particular, FIG. 4A shows the refractive index map of a RKO human colon cancer cell after 200 iterations. In FIG. 4A(i), the center cross-section clearly shows the nucleus and nucleolus of the cell. FIG. 4A(ii) shows horizontal cross-sections extracted for varying heights (15 µm spacing between the slices). Note that the result shows varying structures in the cell with high optical sectioning capability. FIG. 4A(iii) shows the bottom half of a 3-D rendered image of the same cell. The collected optical sections can be stored in memory and separate slices or regions can be selected for viewing.

Figure 4C:
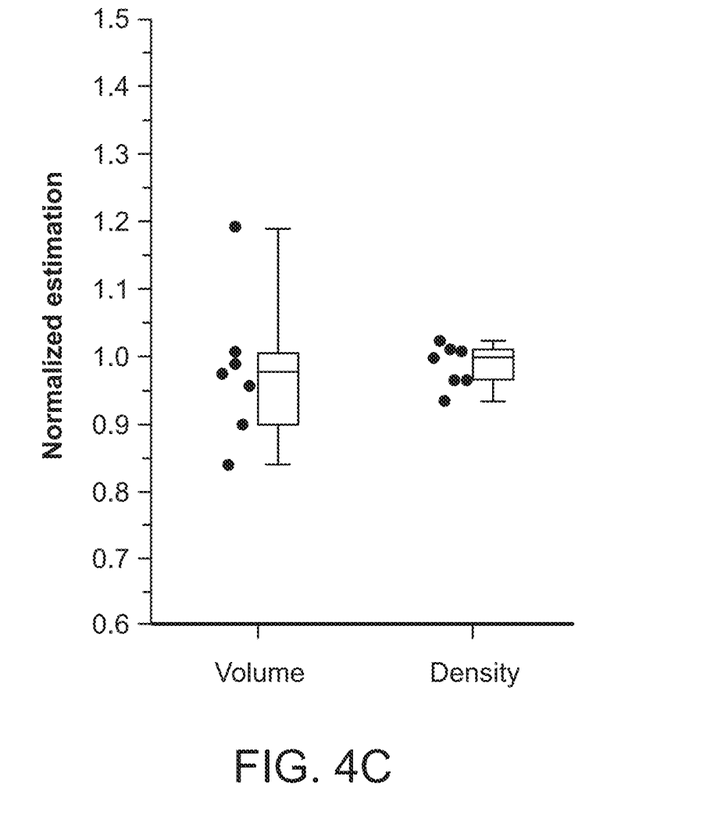
FIG. 4C depicts normalized estimation of volume and density.

Measuring the mass and volume of cells is connected to the fundamental question of biology: how the cells grow and their growth is regulated. The refractive index of a biological specimen is proportional to the concentration of organic molecules within the specimen. Adopting this relationship, one can obtain the density of non-aqueous materials inside a cell, called dry density, from:

$$\rho_{dry} = \frac{1}{\alpha}(n(x, y, z) - n_0), \tag{6}$$

where the quantity a is the average specific refractive index increment, $\alpha=0.18$ $(g/mL)^{-1}$. From the refractive index map, the volume of a sample can be calculated directly with thresholding (e.g., by counting the number of voxels) or from the projected area assuming a spherical shape. The total dry mass within the cell can be obtained by taking an integral of the 3-D density map, Eq. (6), over the cell volume, and the mean dry density is obtained by dividing the total dry mass by the cell volume. To validate this method, 10-µm polystyrene beads have been imaged that are flowing in the index matching oil of refractive index 1.54. The measured diameter of the polystyrene beads (N=8) were 9.89 µm with a standard deviation of 0.35 µm, and the refractive index were 1.583 with a standard deviation of 0.005. These values match well with the values provided by the manufacturer (10 µm, 1.585). When normalized with the manufacturer's values, the volume and refractive index of the beads are 0.980±0.110 and 0.986±0.032, respectively, which are shown in FIG. 4C. These values may be used as estimates for the accuracy of the proposed method in volume and density measurement.

FIG. 4B(i-iii) depict volume, dry mass, and dry density, respectively, of imaged RKO human colon cancer cells (N=60) and imaged RPMI8226 human multiple myeloma cells (N=60). The distributions of mass and volume are broad because the measurement was applied to an asynchronous population of cells. Interestingly, the mean volume of RPMI8226 cells (1654±69 fl) is 11.6±6.3% smaller than that of RKO cells (1845±70 fl), while the mean dry mass of RPMI8226 cells (345±13 pg) is 15.0±5.8% larger than that of RKO cells (300±11 pg). It should be noted that the volume of two cell types is not statistically different (p>0.05, two-tailed t-test, N=60), but RPMI8226 cells (170±5 g/l) have 17.2±5.4% larger mean (dry) density than RKO cells (145±5 g/l) due to their larger mass. Both the dry mass and density are significantly different in two cell types (p<0.01, two-tailed t-test, N=60).

A 3-D holographic imaging flow cytometry (3-D HIFC) provides 3D refractive index map of cells continuously flowing in a micro-fluidic channel. Specifically, samples flow across a line-focused beam, and the system recorded angular spectra scattered from the samples using off-axis digital holography. By adopting a reconstruction algorithm that properly handles the diffraction and missing angle artifacts, the system generates the 3-D refractive index map of cells with high spatial resolution and accuracy. The method does not require any moving system elements, and thus it can be readily incorporated into the downstream of existing flow cytometry configurations to further increase the accuracy of screening. More importantly, the refractive index map contains rich information that can be related to the distribution of mass at cellular or subcellular levels, and thus used for measuring the metabolism of cellular organelles. The system provides for stain-free, accurate single cell characterization using refractive index contrast.

RKO human colon cancer cells were cultured in Dulbecco Modified Eagle medium (Invitrogen, 21063-029) supplemented with 10% FBS (Invitrogen, 10438026) and 1% 100× penicillin-streptomycin solution (Invitrogen, 15140-122). RPMI8226 human multiple myeloma cells were cultured in RPMI 1640 media (Invitrogen, 11835-030) supplemented with 10% FBS, and 1% 100× penicillin-streptomycin solution. At 70-80% confluency, cells were collected with 0.25% Trypsin-EDTA (Invitrogen, 25200-114), diluted 1:100 in fresh culture media, and injected into the micro-fluidic channel with a syringe. 10-µm polystyrene beads and refractive index liquids were purchased from Polysciences, Inc. (17136-5) and Cargille (1809X), respectively.

Returning to FIGS. 1C and 1D depicting exemplary schematic illustrations of systems 40 for off-axis holography based on Mach-Zehnder interferometry, a laser beam from the light source, e.g., He—Ne laser ($\lambda$=633 nm), is split (e.g., using a first beamsplitter B1) into sample and reference beams, and later combined (e.g., using a second beamsplitter B2) before the detector plane (at detector 44). As described above, the sample beam is first focused onto a line in the back focal plane of a high-NA condenser lens L (e.g., NA=1.4) with a cylindrical lens CL (e.g., f=100 mm) Using the high-NA condenser lens L, the line beam is tightly re-focused into a narrow line beam on the sample plane SP, which may be orthogonal to the original sample beam and may have a wider angular coverage. Sample particles (e.g., cells) flow across this line beam in a micro-fluidic channel, and the angular spectra of scattered light from the cells are collected using a high-NA objective lens OL. The collected light is focused using a tube tense (TL) after which the beam is expanded using a cylindrical lens CL2 (e.g., f=400 mm) Two other cylindrical lenses CL1 and CL3 (e.g., f=200 mm) may be used in the beam path to deliver the image in a 4-f configuration along the non-focusing axis. A mirror M1 may be used in between the tube tense (TL) and cylindrical lenses CL1-3 to shift the beam axis such that it is orthogonal with respect to the reference beam thereby enabling recombining thereof using the second beam splitter B2. The magnified image of the angular spectrum, which is incident onto the detector plane, creates an interferogram image together with the reference beam. For off-axis holography, the angle of reference beam is slightly tilted 46 with respect to the collected sample beam, e.g, using a tilt mirror M2. A complementary metal oxide semiconductor (CMOS) camera (1024PCI, Photron) located at the back focal plane of the cylindrical lense CL2 can be triggered by an internal clock or by a separate controller to capture the interferogram images, e.g., at 5000 frame/sec. The data processor 45 can be programmed with software to execute instructions stored on a computer readable medium to process data as descried herein and control system operation. In exemplary embodiments the condenser lens L and/or the objective lens OL may be characterized by a high numerical aperture of greater than 0.5, preferably greater than 1.0 and even more preferably greater than 1.3.

Notably, the use of off-axis holography enables recording both the amplitude and phase of angular spectrum in a single shot for each location of the flowing sample. Thus, in exemplary embodiments, the slight tilt in the reference beam with respect to the sample beam is configured to cause a three pixel fringe period in raw interferogram images. In exemplary embodiment, an angular offset between the detected reference light and the detected scattered light is characterized by a fringe period in raw interferogram images of between 2.5-4 pixels.

In exemplary embodiments the detector system may utilize a scanning resolution of at least 30 images per sample, preferably of at least 100 images per sample or even more preferably of at least 200 images per sample. In some embodiments, the detected angular range may be at least −30 degrees to 30 degrees, preferably at least −45 degrees to 45 degrees, or even more preferably at least −60 degrees to 60 degrees. Thus, detected angular resolution may be at least 2 degrees or more preferably at least 1 degree.

Three-dimensional refractive index measurement enables one to quantify the cell metabolism by measuring the mass of entire cell and internal organelles with minimal perturbation. Using plane-wave tomography, it is demonstrated that adherently growing cells have size-dependent growth rate as floating cells, while division asymmetry is higher in the former. In conjunction with low-noise diffraction phase microscopy, it is further demonstrated herein also showed that mammalian chondrocytes undergo three distinct phases of volume increase. Recent results show that molecular-specific signatures of cells can be obtained from refractive index measurement at multiple wavelengths.

As described herein, systems and methods are provided for refractive index imaging of continuously flowing cells in a microfluidic channel. In particular, the systems and methods described utilize off-axis digital holography that can measure the complex angular spectrum in a single-shot for each location of the flowing sample. For tomographic reconstruction, an algorithm based on the scalar diffraction theory may be adopted to correct the artifacts due to defocused organelles or cells flowing at different heights. Using these techniques, one may obtaine 3-D maps of refractive index of different cell types in the flow configuration, from which one may quantify characteristics such as volume, dry mass and dry density of the cells.

This presents significant advantages over prior techniques for obtaining the cell density in flow configuration which rely on the buoyant mass measurement using a suspended micro-channel resonator for two different density liquids.

where switching the liquids for every measurement may not be ideal for high throughput or long-term imaging of cells in an intact, natural condition.

The tomographic reconstruction algorithm derived and adopted herein assumes that cells' vertical position in the channel is fixed and their rotation is negligible for the period of data collection or for complete passage of each cell across the line-focused beam. Observing the cells under a collimated laser illumination and with a high-speed camera, it can be confirmed that cell tumbling is minimal for the design and flow conditions described herein. However, without a mechanism to stabilize the cells flowing in a micro-fluidic channel, the possibility of cell rotation cannot be completely ruled out. In microfluidic systems the cell rotation is caused by shear forces acting on a cell which is proportional to the speed of the flow and inversely with size of the cell. A cell larger than half the height of the channel will be less affected by this shear as the difference in fluid velocity on the sides of the cell diminishes when the cell straddles the mid-height of the channel. By imaging PDMS beads with air defects, one can estimate that the maximum rotation of cells (mean diameter ~15 μm) during the data acquisition (0.1 sec) is about 4 degrees at a Reynolds number of about $5 \times 10^{-3}$. The minimal effect of this rotation is further confirmed by the sharp boundaries of the cell and nucleus in the reconstructed example images in FIG. 4A, where the rotation would likely have caused blurring.

In a preferred embodiment a plurality of different wavelengths of light can be used to illuminate material flowing in the channel to measure the refractive index dispersion. Further details regarding the use a plurality of wavelengths for tomographic imaging can be found in Sung et al., "Stain-Free Quantification of Chromosomes in Live Cells Using Regularized Tomographic Phase Microscopy," PLOSONE, Vol, 7, 11 (2012), the entire contents of which is incorporated herein by reference. Thus, images of the sample can be obtained at different illumination wavelengths.

The amplitude and phase of each angular spectrum are recorded by an off-axis holography set-up described above. FIGS. 2(i-iv) illustrate how to process the raw interferogram image. The irradiance on the detector can be expressed as:

$$I(x,y) = I_S(x,y) + I_R + 2\sqrt{I_S(x,y)I_R} \cos(2\pi(px+qy) - \Delta\phi(x,y)) \quad (7)$$

where $I_S(x,y)$ and $I_R$ are the irradiances of the sample and reference beams, respectively, and $\Delta\phi(x,y)$ is the phase difference between the two beams. The vector (u,q) indicates the angle of incidence of the sample beam on the detector plane with respect to the angle of the reference beam. The magnitude and angle of the vector explain the spacing and orientation of the fringes (see the inset of FIG. 2(i), respectively, in the raw interferogram. FIG. 2(ii) shows the magnitude of the Fourier transform of FIG. (2i) or Eq. (7) on a logarithmic scale (base 10). The region inside the dotted circle can be described by $$\hat{I}(u,v) = \iint \sqrt{I_S(x,y)I_R} e^{i(2\pi(px+qy)-\Delta\phi(x,y))} e^{-i2\pi(ux+vy)} dxdy = \hat{\Phi}(u-p, v-q) \quad (8)$$

where $\hat{\Phi}(u, v)$ is the Fourier transform of $\Phi(x,y) = \sqrt{I_S(x,y)I_R} e^{-i\Delta\phi(x,y)}$. Note that one can obtain the function $\Phi(x,y)$ by selecting the region in the dotted circle, moving it to the origin of the frequency coordinates, and taking its inverse Fourier transform. The images in FIGS. 2(iii) and 2(iv) are the amplitude and phase images, respectively, obtained from FIG. 2(i).

Microfluidic devices were manufactured by molding of polydimethylsiloxane (PDMS, Dow Corning, Midland, Mich.) on a micro-fabricated master mold. The mold was fabricated using standard photolithographic technologies as described below. A silicon wafer was baked in an oven set to 200° C. for 30 minutes, cleaned with oxygen plasma (March, Concord, Calif.), and then spun coated with SU-8 25 photoresist (SU8, Microchem, Newton, Mass.) at 1850 rpm to achieve a final thickness of approximately 30 μm and processed following the standard protocol as recommended by the manufacturer. A thin layer of PDMS (thickness <200 μm) was prepared, degassed in a vacuum chamber for 1 hour, and then spun on the wafer at 600 rpm for 15 seconds. After baking for 8 hours at 65° C., the thin PDMS layer covering the master along with thicker, cured, and previously-cut PDMS pieces (length ~1 cm, width ~0.5 cm, height ~0.3 cm) were exposed to 20 seconds of oxygen plasma and bonded on the inlet and outlet regions (FIG. 1E). The mold was baked at 75° C. for 10 minutes, cut, slowly peeled off the master mold, and then punched with a 0.75 mm puncher to define the inlet and the outlet holes of the device. Finally, a 48×65 mm No. 1 gold-coated cover glass (Fisher Scientific, Pittsburgh, Pa.) along with the punched membrane-based channel device were exposed to 20 seconds of oxygen plasma and carefully bonded at 75° C. for 10 minutes to define the micro-fluidic channels. Two pieces of flexible plastic tubing were cut to a length of ~3 cm (Tygon, ID 0.010 inch×OD 0.030 inch, Greene Rubber Co., Woburn, Mass.) and then inserted into the inlet and outlet holes of the device. A 30 g blunt needle (Brico Medical Supplies, Dayton, N.J.) was then inserted into one of the tubes to allow for a syringe to be connected for sample loading purposes. Another fluid sample source can be connected to the inflow port for use with the system. A sample collection container can be used to collect the imaged sample from the outflow port.

Figure 5:
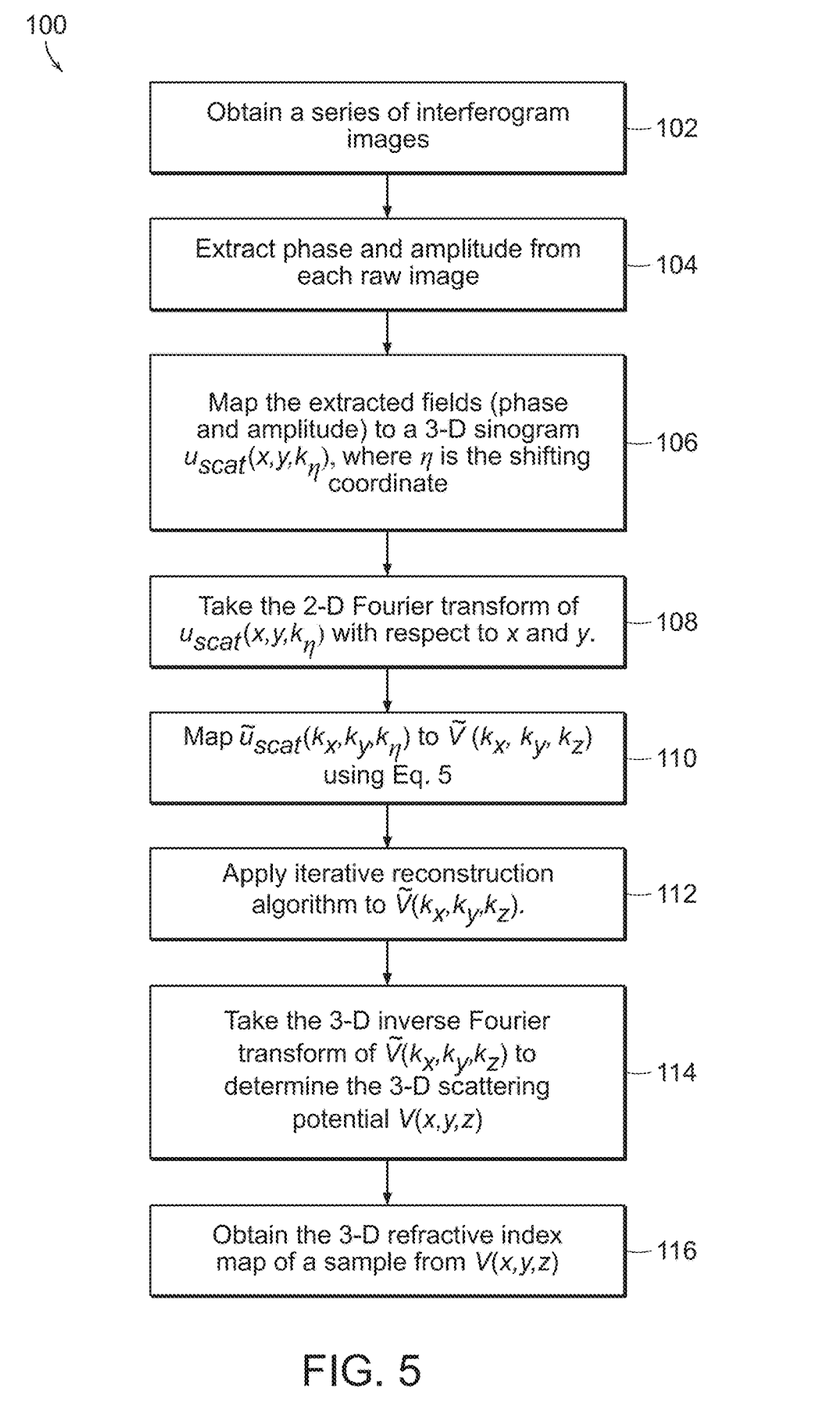
FIG. 5 is a process sequence for determining a refractive index distribution in accordance with preferred embodiments of the invention.

Illustrated in FIG. 5 is a processing sequence 100 in accordance with preferred embodiments of the invention in which a data processor 45 receives image data from the imaging detector and processes the image data to generate two and three dimensional images of a sample moving through the system field of view within the flow channel and determines a three dimensional distribution of the refractive index of the sample. A software program can be stored in memory so that the data processor executes the following series of instructions. A series of interferogram images are detected 102 to generate three dimensional images of an object. Phase and amplitude data from each raw image are extracted 104 and can be stored in memory for further processing. The extracted fields can be mapped to a 3-D sonogram 106 where η is the varying coordinate. A Fourier transformation of the sinogram is computed 108 with respect to the x-y plane and the result is mapped 110 to the scattering potential in the frequency domain. An iterative reconstruction process 112 is applied as described herein and the inverse Fourier transform 114 is used to generate the computed refractive index distribution 116.

Figure 6A:
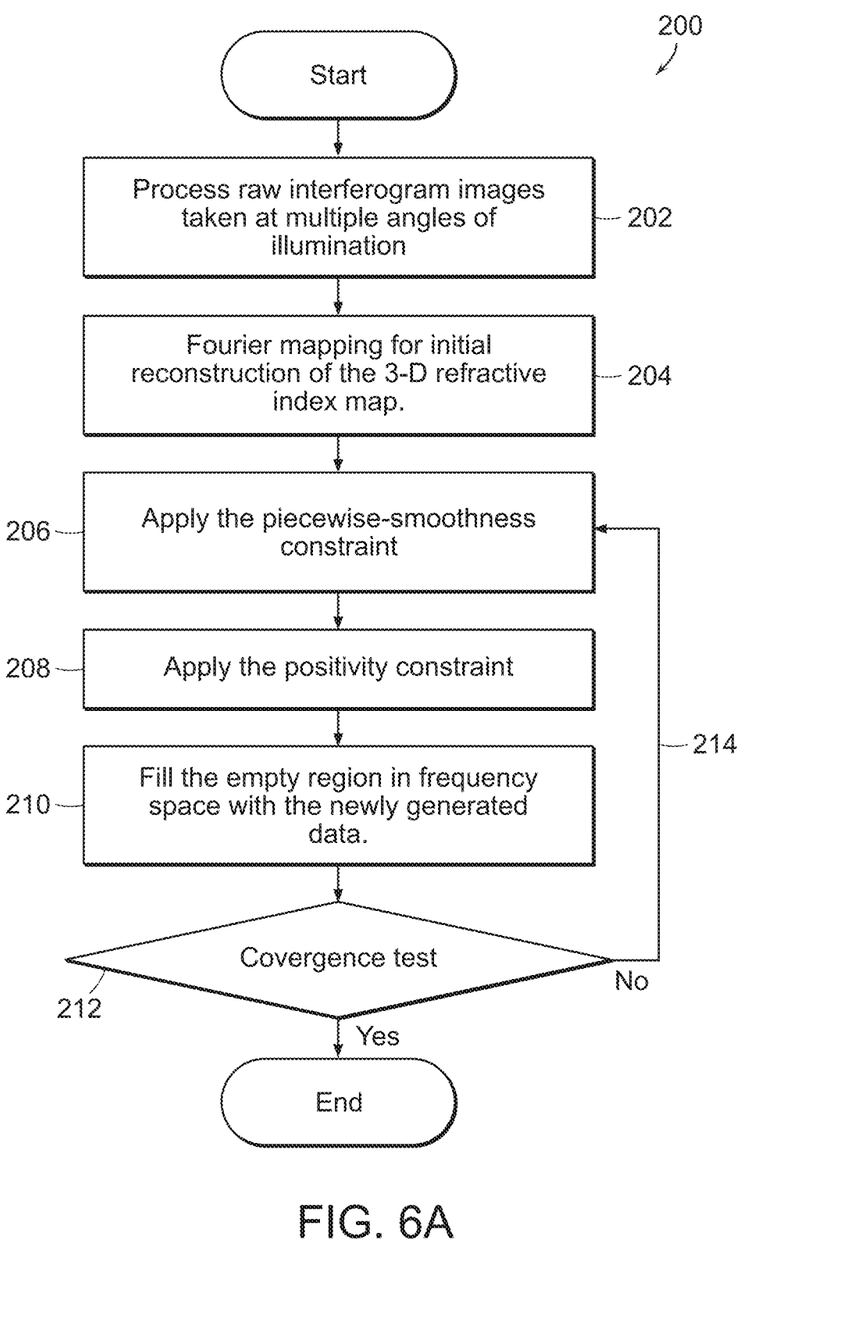
FIGS. 6A and 6B are process flow diagrams illustrating preferred methods of measuring and analyzing sample data.

Preferred embodiments of the present invention can utilize a multimodal imaging capability to generate complementary information regarding the sample. This can also provide additional analytical processes to further characterize the material being measured. FIG. 6A illustrates a process flow sequence 200 in which interferogram images are obtained from different angles 202 as described previously. After Fourier mapping 206, a smoothing constraint 208 can be applied to the data in order to more accurately reflect the morphology of the material being measured. For example, cellular material typically has a more uniform refractive index distribution in the center, and undergoes a steep transition at the cell boundary. A positivity constraint can also be utilized that can indicate that the cells of interest have a higher index than the surrounding medium flowing within the channel. The additional data can also be used to populate empty regions of the frequency space 210 which can occur due to sampling errors. This regularization process can be used as part of an iterative processing sequence such that convergence 212 can be measured and the constraining steps repeated 214 as needed to achieve the desired convergence value.

Figure 6B:
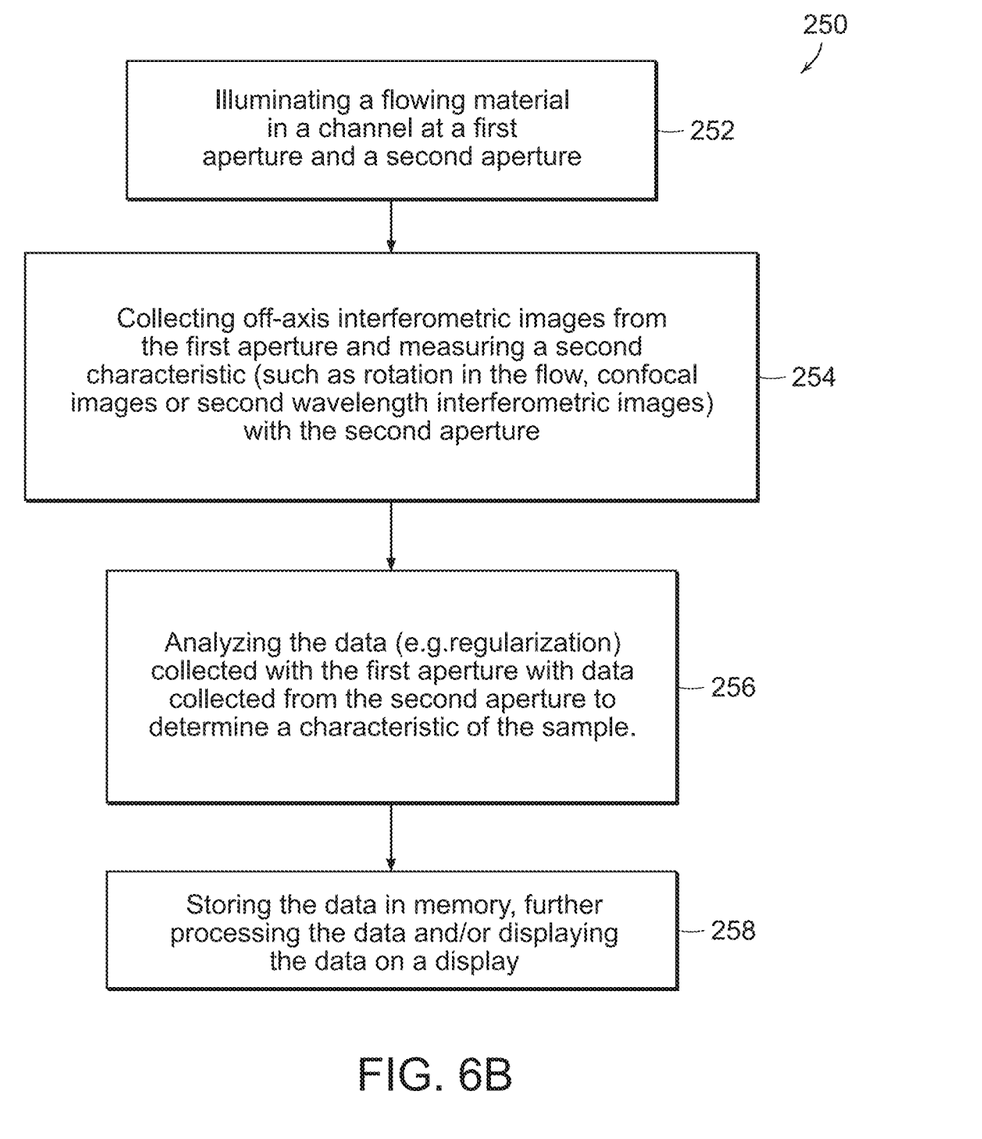

As seen in the process sequence 250 of FIG. 6B, preferred embodiments can provide for measurements through multiple apertures or regions 252 in the channel to determine different characteristics 254. In addition to the interferometric imaging described generally herein, a second detector can be used for measurements at a second region to determine if cells in the flow are rotating during the measurement, the rate of rotation and generate compensation signals that can be used to adjust imaging parameters such as increasing the number of angular samples to correct for the rate of rotation. Alternatively, confocal imaging using a second laser light source that reflects light off of the sample can be used to image the full volume of the sample such that the resulting image data can be corrected for a lower angular sampling process. Fluorescence of the sample can be measured using this method. Another option is to generate images at a second wavelength and the images compared to detect different structural or compositional characteristics of the material. This data can be analyzed 256 using the iterative techniques described herein. The data can be stored 258 for further processing or display.

While the present invention has been described herein in conjunction with certain preferred embodiments, a person with ordinary skill in the art, after reading the present application, can effect changes, substitutions of equivalents and other alterations to the devices and methods set forth herein. Each embodiment described herein can also have included therein such variations as disclosed with other embodiments.

What is claimed is:

1. A method of flow cytometry comprising:
   continuously moving a sample in a flowing medium through a channel, the channel having a size to enable flow of the sample during illumination of the sample;
   illuminating the moving sample passing through a sample light path with converging light within the channel using a single shot of illuminating light at each of a plurality of locations of the sample within the channel, the converging light forming a line focused beam having a plurality of plane waves;
   detecting light from the continuously moving sample in response to the illuminating light and reference light directed along a reference light beam path with a detector at each of the plurality of locations, the reference light beam path and the sample light path being angularly offset at the detector;
   processing the detected light from the continuously moving sample and the reference light with a data processor to form a plurality of angular spectra related to the plurality of locations;
   mapping phase data and amplitude data of the plurality of angular spectra to a three-dimensional representation;
   forming a two-dimensional Fourier transform of the mapped angular spectra; and
   mapping the Fourier-transformed angular spectrum to a scattering potential of the sample in a spatial frequency space.

2. The method of claim 1 further comprising generating a plurality of phase images of the sample.

3. The method of claim 1 further comprising illuminating the channel on a line extending across the channel.

4. The method of claim 1 further comprising displaying the three-dimensional representation on a display.

5. The method of claim 1 further comprising determining a refractive index or refractive index distribution of the sample.

6. The method of claim 1 further comprising focusing light onto the channel with a converging cylindrical optical element.

7. The method of claim 1 further comprising adjusting a flow speed of a fluid within the channel.

8. The method of claim 1 further comprising generating an interferogram image of the sample.

9. The method of claim 1 further comprising performing an iterative computation to provide a computed scattering potential.

10. The method of claim 1 further comprising performing an inverse Fourier transform to determine a three dimensional scattering potential.

11. The method of claim 1 further comprising tilting with a mirror the reference light beam path relative to the sample light path to select the angular offset.

12. The method of claim 11 wherein the reference light beam path and the sample light beam path are tilted at an angle greater than zero.

13. The method of claim 1 further comprising moving an illumination beam with an actuated optical element.

14. The method of claim 13 wherein the actuated optical element comprises a movable mirror.

15. The method of claim 13 wherein the actuated optical element comprises a scanner.

16. The method of claim 1 further comprising processing image data with at least one of a smoothness constraint or a positivity constraint.

17. The method of claim 1 further comprising generating data to populate a region of a frequency space.

18. The method of claim 1 further comprising illuminating the sample at a first wavelength and at a second wavelength.

19. The method of claim 1 wherein the detector generates data and further comprising regularizing the data.

20. The method of claim 1 further comprising measuring a rotation of a region of the sample in the channel.

21. The method of claim 1 further comprising detecting fluorescence in the sample.

22. The method of claim 1 further comprising programming a control system with scan parameters to scan light on the sample.

23. The method of claim 1 further comprising delivering illuminating light into a full field of view of the channel.

24. The method of claim 1 further comprising obtaining a confocal image of the sample in the channel.

* * * * *